(12) United States Patent
Speer (10) Patent No.: US 7,424,350 B2
(45) Date of Patent: Sep. 9, 2008

(54) VEHICLE CONTROL SYSTEMS AND CORRESPONDING SIZING METHODS

(75) Inventor: Thomas E. Speer, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 653 days.

(21) Appl. No.: 10/770,256

(22) Filed: Feb. 2, 2004

(65) Prior Publication Data

US 2005/0171652 A1  Aug. 4, 2005

(51) Int. Cl.
*B64C 5/10* (2006.01)
*B64C 9/00* (2006.01)
*G06F 7/00* (2006.01)

(52) U.S. Cl. .................. 701/3; 244/90 R; 244/225; 244/229

(58) Field of Classification Search ................ 244/212, 244/225, 229, 90 R, 88–89, 99.2, 211–217; 701/3

See application file for complete search history.

(56) References Cited

U.S. PATENT DOCUMENTS

| | | | |
|---|---|---|---|
| 1,724,456 A | 8/1929 | Crook | |
| 1,770,575 A | 7/1930 | Ksoll | |
| 2,086,085 A | 7/1937 | Lachmann et al. | |
| 2,169,416 A | 8/1939 | Griswold | |
| 2,282,516 A | 5/1942 | Hans et al. | |
| 2,289,704 A | 7/1942 | Grant | |
| 2,319,383 A | 5/1943 | Zap | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,385,351 A | 9/1945 | Davidsen | |
| 2,387,492 A | 10/1945 | Blaylock et al. | |
| 2,389,274 A | 11/1945 | Pearsall et al. | |
| 2,406,475 A | 8/1946 | Rogers | |
| 2,422,296 A * | 6/1947 | Flader et al. | ................. 244/211 |

(Continued)

FOREIGN PATENT DOCUMENTS

DE  387833  1/1924

(Continued)

OTHER PUBLICATIONS

"Adaptive Aircraft: No Flight of Fancy?" Research into using exotic means of making wings change shpe in-flight looks promising, though still a long way from reality, Business Week Online, Jan. 7, 2003, pp. 1-3.

(Continued)

*Primary Examiner*—Thomas G. Black
*Assistant Examiner*—Christine M Behncke
(74) *Attorney, Agent, or Firm*—Perkins Coie LLP (57) ABSTRACT

Vehicle control systems and methods for sizing such systems are disclosed. In one embodiment of the invention, an actuator mechanism capability is selected, at least one operating requirement is selected, and the required number, size, and locations of a plurality of control surfaces needed to satisfy the at least one operating requirement are determined. In another embodiment, a set of control laws is selected, at least one operating requirement is selected, and the number size, and location of a plurality of control surfaces needed to satisfy the at least one operating requirement are determined.

18 Claims, 5 Drawing Sheets

U.S. PATENT DOCUMENTS

| | | |
|---|---|---|
| 2,444,293 A | 6/1948 | Holt |
| 2,458,900 A | 1/1949 | Emy |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | James et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,191,147 A | 6/1965 | Majendie |
| 3,203,275 A | 8/1965 | Hoover |
| 3,203,647 A | 8/1965 | Alvarez-Calderon |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda |
| 3,813,062 A | 5/1974 | Prather |
| 3,827,658 A | 8/1974 | Hallworth |
| 3,831,886 A | 8/1974 | Burdges et al. |
| 3,834,601 A | 9/1974 | Cole |
| 3,836,099 A | 9/1974 | O'Neill et al. |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregir |
| 3,917,192 A | 11/1975 | Alverez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,987,983 A | 10/1976 | Cole et al. |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,141,768 A | 2/1979 | Lo et al. |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A * | 2/1980 | Wang .................. 244/214 |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,247,843 A | 1/1981 | Miller |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,325,123 A | 4/1982 | Graham |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly et al. |
| 4,427,168 A | 1/1984 | McKinney |
| 4,441,675 A * | 4/1984 | Boehringer et al. ......... 244/213 |
| 4,444,368 A | 4/1984 | Andrews |
| 4,448,375 A | 5/1984 | Herndon |
| 4,459,084 A | 7/1984 | Clark |
| 4,461,449 A | 7/1984 | Turner |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch et al. |
| 4,528,775 A | 7/1985 | Einarsson |
| 4,533,096 A | 8/1985 | Baker et al. |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,637,573 A | 1/1987 | Perin et al. |
| 4,650,140 A | 3/1987 | Cole |
| 4,691,879 A | 9/1987 | Greene |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A | 5/1988 | Williams |

| | | | | | | |
|---|---|---|---|---|---|---|
| 4,784,355 A | 11/1988 | Brine | | 6,082,679 A | 7/2000 | Crouch et al. |
| 4,786,013 A | 11/1988 | Pohl | | 6,085,129 A | 7/2000 | Schardt |
| 4,789,119 A | 12/1988 | Bellego et al. | | 6,109,567 A | 8/2000 | Munoz |
| 4,796,192 A | 1/1989 | Lewis | | 6,112,141 A | 8/2000 | Briffe |
| 4,823,836 A | 4/1989 | Bachmann et al. | | 6,145,791 A | 11/2000 | Diller et al. |
| 4,838,503 A | 6/1989 | Williams et al. | | 6,152,405 A | 11/2000 | Muller et al. |
| 4,854,528 A | 8/1989 | Hofrichter et al. | | 6,161,801 A | 12/2000 | Kelm |
| 4,856,735 A | 8/1989 | Lotz | | 6,164,598 A | 12/2000 | Young et al. |
| 4,860,007 A | 8/1989 | Konicke | | 6,173,924 B1 | 1/2001 | Young et al. |
| 4,867,394 A | 9/1989 | Patterson, Jr. | | 6,188,937 B1 | 2/2001 | Sherry |
| 4,892,274 A | 1/1990 | Pohl et al. | | 6,189,837 B1 | 2/2001 | Matthews |
| 4,899,284 A | 2/1990 | Lewis | | 6,213,433 B1 | 4/2001 | Gruensfelder |
| 4,962,902 A | 10/1990 | Fortes | | 6,227,498 B1 | 5/2001 | Arata |
| 5,039,032 A | 8/1991 | Rudolph | | 6,244,542 B1 | 6/2001 | Young et al. |
| 5,046,688 A | 9/1991 | Woods | | 6,293,497 B1 | 9/2001 | Kelley-Wickemeyer |
| 5,050,081 A | 9/1991 | Abbott et al. | | 6,328,265 B1 | 12/2001 | Dizdarevic |
| 5,056,741 A | 10/1991 | Bliesner et al. | | 6,349,798 B1 | 2/2002 | McKay |
| 5,074,495 A | 12/1991 | Raymond | | 6,349,903 B2 | 2/2002 | Caton et al. |
| 5,082,207 A | 1/1992 | Tulinius | | 6,364,254 B1 | 4/2002 | May |
| 5,082,208 A | 1/1992 | Matich | | 6,375,126 B1 | 4/2002 | Sakurai |
| 5,088,665 A | 2/1992 | Vijgen | | 6,382,566 B1 | 5/2002 | Ferrel et al. |
| 5,094,411 A | 3/1992 | Rao | | 6,389,333 B1 | 5/2002 | Hansman |
| 5,094,412 A | 3/1992 | Narramore | | 6,431,498 B1 | 8/2002 | Watts et al. |
| 5,100,082 A | 3/1992 | Archung | | 6,439,512 B1 | 8/2002 | Hart |
| 5,114,100 A | 5/1992 | Rudolph | | 6,443,394 B1 | 9/2002 | Weisend |
| 5,129,597 A | 7/1992 | Manthey | | 6,450,457 B1 | 9/2002 | Sharp et al. |
| 5,158,252 A | 10/1992 | Sakurai | | 6,464,175 B2 | 10/2002 | Yada et al. |
| 5,167,383 A | 12/1992 | Nozaki | | 6,466,141 B1 | 10/2002 | McKay et al. |
| 5,203,619 A | 4/1993 | Welsch | | 6,478,541 B1 | 11/2002 | Charles et al. |
| 5,207,400 A | 5/1993 | Jennings | | 6,481,667 B1 | 11/2002 | Ho |
| 5,244,269 A | 9/1993 | Harriehausen | | 6,484,969 B2 | 11/2002 | Sprenger |
| 5,259,293 A | 11/1993 | Brunner | | 6,499,577 B2 | 12/2002 | Kitamoto et al. |
| 5,280,863 A | 1/1994 | Schmittle | | 6,536,714 B2 | 3/2003 | Gleine |
| 5,282,591 A | 2/1994 | Walters et al. | | 6,547,183 B2 | 4/2003 | Farnsworth |
| 5,351,914 A | 10/1994 | Nagao | | 6,554,229 B1 | 4/2003 | Lam |
| 5,388,788 A | 2/1995 | Rudolph | | 6,561,463 B1 | 5/2003 | Yount et al. |
| 5,420,582 A | 5/1995 | Kubbat | | 6,568,189 B2 | 5/2003 | Blot-Carretero et al. |
| 5,441,218 A | 8/1995 | Mueller | | 6,591,169 B2 | 7/2003 | Jones et al. |
| 5,474,265 A | 12/1995 | Capbern | | 6,598,829 B2 | 7/2003 | Kamstra |
| 5,493,497 A | 2/1996 | Buus | | 6,598,834 B2 | 7/2003 | Nettle |
| 5,535,852 A | 7/1996 | Bishop | | 6,601,801 B1 | 8/2003 | Prow |
| 5,542,684 A | 8/1996 | Squirrell | | 6,622,972 B2 | 9/2003 | Urnes |
| 5,544,847 A | 8/1996 | Bliesner | | 6,622,974 B1 | 9/2003 | Dockter et al. |
| 5,564,655 A | 10/1996 | Garland et al. | | 6,625,982 B2 | 9/2003 | Van Den Bossche |
| 5,600,220 A | 2/1997 | Thoraval | | 6,644,599 B2 | 11/2003 | Perez |
| 5,609,020 A | 3/1997 | Jackson | | 6,651,930 B1 | 11/2003 | Gautier et al. |
| 5,680,120 A | 10/1997 | Tilleman | | 6,698,523 B2 | 3/2004 | Barber |
| 5,680,124 A | 10/1997 | Bedell et al. | | 6,729,583 B2 | 5/2004 | Milliere et al. |
| 5,681,014 A | 10/1997 | Palmer | | 6,745,113 B2 | 6/2004 | Griffin |
| 5,686,907 A | 11/1997 | Bedell et al. | | 6,755,375 B2 | 6/2004 | Trikha |
| 5,711,496 A * | 1/1998 | Nusbaum .................... 244/214 | | 6,796,526 B2 | 9/2004 | Boehringer |
| 5,715,163 A | 2/1998 | Bang | | 6,796,534 B2 | 9/2004 | Beyer |
| 5,735,485 A | 4/1998 | Ciprian et al. | | 6,799,739 B1 | 10/2004 | Jones |
| 5,740,991 A | 4/1998 | Gleine et al. | | 6,802,475 B2 | 10/2004 | Davies et al. |
| 5,743,490 A | 4/1998 | Gillingham | | 6,843,452 B1 | 1/2005 | Vassberg et al. |
| 5,746,490 A | 5/1998 | Domenig | | 6,860,452 B2 | 3/2005 | Bacon et al. |
| 5,788,190 A | 8/1998 | Siers | | 6,870,490 B2 | 3/2005 | Sherry et al. |
| 5,839,698 A | 11/1998 | Moppert | | 6,978,971 B1 | 12/2005 | Dun |
| 5,875,998 A * | 3/1999 | Gleine et al. ................ 244/195 | | 6,981,676 B2 | 1/2006 | Milliere |
| 5,915,653 A | 6/1999 | Koppelman | | 7,007,889 B2 | 3/2006 | Charron |
| 5,921,506 A | 7/1999 | Appa | | 7,007,897 B2 * | 3/2006 | Wingett et al. .............. 244/227 |
| 5,927,656 A | 7/1999 | Hinkleman | | 7,028,948 B2 | 4/2006 | Pitt |
| 5,934,615 A | 8/1999 | Treichler | | 7,048,228 B2 | 5/2006 | Vassberg et al. |
| 5,978,715 A | 11/1999 | Briffe | | 7,048,234 B2 | 5/2006 | Recksiek et al. |
| 5,984,230 A | 11/1999 | Drazi | | 7,048,235 B2 | 5/2006 | McLean et al. |
| 6,015,117 A | 1/2000 | Broadbent | | 7,051,982 B1 | 5/2006 | Johnson |
| 6,033,180 A | 3/2000 | Machida et al. | | 7,059,563 B2 | 6/2006 | Huynh |
| 6,045,204 A | 4/2000 | Frazier | | 7,147,241 B2 | 12/2006 | Beaujot et al. |
| 6,057,786 A | 5/2000 | Briffe | | 7,226,020 B2 | 6/2007 | Pohl et al. |
| 6,073,624 A | 6/2000 | Laurent | | 2002/0046087 A1 | 4/2002 | Hey |
| 6,076,767 A * | 6/2000 | Farley et al. ................ 244/78.1 | | 2003/0058134 A1 | 3/2003 | Sherry et al. |
| 6,076,776 A | 6/2000 | Breitbach | | 2003/0132860 A1 | 7/2003 | Feyereisen |
| 6,079,672 A | 6/2000 | Lam et al. | | 2003/0197097 A1 | 10/2003 | Wakayama |

| | | | |
|---|---|---|---|
| 2004/0004162 | A1 | 1/2004 | Beyer |
| 2004/0059474 | A1 | 3/2004 | Boorman |
| 2004/0195464 | A1 | 10/2004 | Vassberg et al. |
| 2005/0011994 | A1 | 1/2005 | Sakurai et al. |
| 2005/0017126 | A1 | 1/2005 | McLean et al. |
| 2005/0109876 | A1 | 5/2005 | Jones |
| 2005/0224662 | A1 | 10/2005 | Lacy et al. |
| 2005/0242234 | A1 | 11/2005 | Mahmulyin |
| 2006/0000952 | A1 | 1/2006 | Rampton et al. |
| 2006/0038086 | A1 | 2/2006 | Reckzeh |
| 2006/0049308 | A1 | 3/2006 | Good et al. |
| 2006/0102803 | A1 | 5/2006 | Wheaton et al. |
| 2006/0169847 | A1 | 8/2006 | Konings |
| 2006/0175468 | A1 | 8/2006 | Huynh et al. |
| 2006/0226297 | A1 | 10/2006 | Perez-Sanchez |
| 2006/0245882 | A1 | 11/2006 | Khan et al. |
| 2006/0261217 | A1 | 11/2006 | Voogt |
| 2007/0034748 | A1 | 2/2007 | Sakurai et al. |
| 2007/0114328 | A1 | 5/2007 | Lacy et al. |
| 2007/0114329 | A1 | 5/2007 | Lacy et al. |
| 2007/0176051 | A1 | 8/2007 | Good et al. |

FOREIGN PATENT DOCUMENTS

| | | |
|---|---|---|
| DE | 1129379 | 5/1962 |
| EP | 0100775 A1 | 2/1984 |
| EP | 0 103 038 | 3/1984 |
| EP | 0215211 | 3/1987 |
| EP | 0 370 640 | 5/1990 |
| EP | 0 483 504 A1 | 5/1992 |
| EP | 0 489 521 | 6/1992 |
| EP | 0781704 | 2/1997 |
| EP | 0781704 A1 | 2/1997 |
| EP | 0 947 421 | 10/1999 |
| EP | 1010616 | 6/2000 |
| EP | 1338506 | 8/2003 |
| EP | 1462361 | 9/2004 |
| EP | 1 547 917 A1 | 6/2005 |
| FR | 705155 | 6/1931 |
| FR | 984443 | 7/1951 |
| FR | 56121 | 9/1952 |
| FR | 57988 | 9/1953 |
| FR | 58273 | 11/1953 |
| GB | 886136 | 1/1962 |
| GB | 1181991 A | 2/1970 |
| GB | 2 144 688 A | 3/1985 |
| WO | WO-02/24530 | 3/2002 |

OTHER PUBLICATIONS

"Aero-Space Research & Technology," Space Systems, Sep. 1, 2001, pp. 1-28.
Leaf Spring Retainer Seals; EMP, Inc.; 2 pgs.
Morphing Aircraft Structures, "Morphing Aircraft Structures-Raytheon," <<http://www.defense-update.com/products/m/morphing-structures.htm>>, pp. 1-3, [Accessed Aug. 31, 2005].
Morphing Aircraft Structures, "Morphing Aircraft Structures-The Cellular Approach," <http://www.personal.psu.edu/users/d/s/dsr134/mas/Cellular.htm>, Penn State University, pp. 1-3 [Accessed Aug. 31, 2005].
Morphing Systems, "Morphing Aerostructures-An Overview," www.crgrp.net/morphingsystems.htm <http://www.crgrp.net/morphingsystems.htm>, pp. 1-9, [Accessed Aug. 31, 2005].
U.S. Appl. No. 10/671,435, Kelly-Wickemyer.
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16 [Accessed Aug. 7, 2003].
Petrov, A.V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU 1-44 Canard, 1 pg, date unknown.
Tucker et al., "Enhanced Vertical Situation Display", filed Jun. 30, 2004, 11 pgs.
Whitcomb, Richard T., "Review of NASA Supercritical Airfoils," National Aeornautics and Space Administration, Aug. 1974 (pp. 8-18).
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
European Search Report for European Patent Application No. EP 03 07 7840, The Boeing Company, Nov. 4, 2003 (2 pgs).
Flap Drive System, 777 Maintenance Manual, Publication Date: Circa 1994 (1 page).
Flap Transmission and Support, 777 Maintenance Manual, Publication Date: Circa 1994 (1 page).
International Search Report, PCT/US03/19724/ Sep. 11, 2003, 5 pages.
MOOG, Component Maintenance Manual, May 1994 (2 pages).
Niu, Chen-Yen, Airframe Structural Design, Chen-Yeun Niu, Conmilit Press, 1988 (1 page).
U.S. Appl. No. 60/475,828, Kevin W. Beyer.
U.S. Appl. No. 10/454,417, Neal V. Huynh.
U.S. Appl. No. 11/220,446, filed Nov. 7, 2005, Kordel et al.
U.S. Appl. No. 11/453,596, filed Jun. 14, 2006, Fox et al.
"Flap (aircraft)", Wikipedia, The Free Encyclopedia, Aug. 3, 2006, 10:18 UTC. Wikimedia Foundation, Inc. Aug. 5, 2006; http://en.wikipedia.org/w/index.php?title=Flap_%28aircraft%29&oldid=67413665>.
"Slats." Wikipedia, The Free Encyclopedia. Jun. 27, 2006, 12:32 UTC. Wikimedia Foundation, Inc. Aug. 5, 2006; http://wn.wikipedia.org/w/index.php?title=Slats&oldid=60827639>.

* cited by examiner

VEHICLE CONTROL SYSTEMS AND CORRESPONDING SIZING METHODS

TECHNICAL FIELD

The following disclosure relates generally to vehicle control surfaces and corresponding sizing methods, for example, sizing control surfaces on vehicles designed to operate in a fluid flow environment to use common actuator mechanisms.

BACKGROUND

Aircraft use various control surfaces that, through interaction with the airflow around the aircraft, produce forces and moments about the aircraft center of gravity to provide flight path control. Primary flight control surfaces can include ailerons for roll control, elevators for pitch control, and rudders for yaw control. Conventional lift and drag devices can include leading edge devices, trailing edge flaps, spoilers, and speed brakes.

Figure 1:
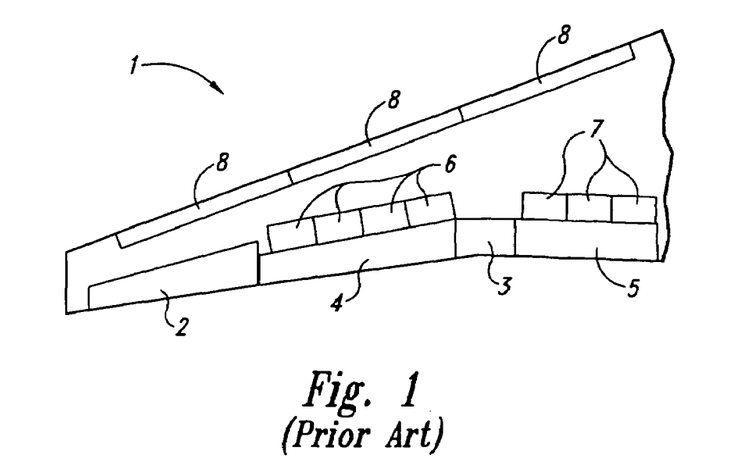
FIG. 1 is a partially schematic top plan view of a conventional aircraft wing in accordance with the prior art.

FIG. 1 is a partially schematic top view of a conventional aircraft wing 1, having a low speed aileron 2, a high speed aileron 3, an outboard flap 4, an inboard flap 5, flight spoilers 6, ground spoilers 7, and leading edge devices 8 configured in accordance with the prior art. Each control surface is designed to provide specific functionality. For example, the high speed aileron 3 is designed to provide roll control when the aircraft is operating at high speed. The flight spoilers 6 are designed to augment roll control throughout the flight envelope. During low speed operation, the low speed aileron 2 is designed to augment the roll control provided by the high speed aileron 3 and the flight spoilers 6. The inboard flap 5 and the outboard flap 4 are designed to provide various high lift configurations used for takeoff and landing. The flight spoilers 6, in addition to augmenting roll control, are designed to provide a high drag configuration in flight. On the ground (e.g., during landing rollout or an aborted takeoff) the flight spoilers 6 and the ground spoilers 7 are designed to provide drag to aid in slowing the aircraft. Additionally, on the ground, the flight spoilers 6 and the ground spoilers 7 are designed to decrease the lift produced by the wing, placing more weight on the wheels, and thereby increasing the effectiveness of the wheel brakes.

The typical design process, which yields the design depicted in FIG. 1, includes determining the operating requirements of the aircraft, the location and size of the control surfaces, the flight control laws that will be used (if any), and then determining the actuator size for each control surface. Determining the operating requirements includes defining vehicle characteristics, the environment in which the vehicle will operate, and various operating states that the vehicle may experience. For example, operating requirements for an aircraft can include, among other things, the aircraft's characteristics such as size and weight, takeoff distance, landing distance, normal load factor capabilities, range, stall characteristics, descent capabilities, climb capabilities, and a range of operating airspeeds. Environmental factors can include, among other things, an operating range of air density, an operating range of air temperature, and environmental discontinuities such as gusts and wind shears. Operating states can include, among other things, a carriage of external stores, the capability to operate with a power plant failure, and/or the capability to operate with a flight control surface that is jammed such that it will not move from a fixed position.

As noted above, after the operating requirements are defined, the location and estimated size of the various control surfaces needed to satisfy the operating requirements are chosen. Typically, conventional control surface locations are chosen on the wing and tail sections of the aircraft. The size of the control surfaces results from the amount of surface area needed to generate the forces and moments to satisfy the operating requirements. Control surfaces may b actuated by pure mechanical means through hydraulic actuators or by fly-by-wire or fly-by-light systems using a computer-based set of control laws that command the appropriate deflection of the control surface needed to satisfy the operating requirements and achieve the commanded flight path or aircraft response.

If a set of control laws is used, it may be an augmentation system, which provides command signals to the control surfaces in addition to pure mechanical inputs, or a full authority control system where there are no direct mechanical links to the control surfaces. In either case, the set of control laws is typically implemented using a combination of sensors and look-up tables to determine the appropriate control surface movement to satisfy the operating requirements and achieve the desired flight path or aircraft response. Typically, the set of control laws is designed with the operating requirements in mind and tailored during the design process to the size and location of the control surfaces used.

After the control surfaces have been sized and located, and the set of control laws defined (if applicable), the required actuator characteristics needed to satisfy the operating requirements are determined for each control surface. These characteristics can include, but are not limited to, actuator rate capabilities, actuator force capabilities (instantaneous and prolonged), damping characteristics, blow-down characteristics, and response to a loss of hydraulic pressure if a hydraulic actuator is used. The required actuation capability is determined for each control surface based on the operating requirements, control surface size, and control surface functionality.

For example, an aileron providing roll control is required to move rapidly so that an operator can maneuver the aircraft during various phases of flight, including landing or in response to an upset caused by a gust of wind. Conversely, on a transport aircraft, the flaps generally do not need to move rapidly since they are typically used to configure the aircraft for longer term tasks, including takeoff, landing, or cruise. These configurations generally maintain the flaps in a fixed position for at least several minutes, and the flaps often take several seconds to transition to the various positions. Accordingly, different control surfaces will require actuators with different actuation rate capabilities.

Similarly, different control surfaces will have different actuation force requirements. For example, the actuator operating a spoiler panel or an aileron may not be required to generate as much force as an actuator operating a larger surface such as a flap. Other actuation requirements vary from control surface to control surface in a similar manner. This variation in requirements results in the need to use actuators with different capabilities throughout the control system in order to satisfy the operating requirements given the size, location, and function of each control surface.

One shortcoming of the prior art design process, and resulting design, is that the aircraft is built with numerous specialized control surfaces, positioned by numerous actuator types having diverse capabilities. This increases the design and manufacturing costs of the aircraft because numerous types of actuators with varying characteristics must be designed, manufactured, and inventoried for use in production. These different actuator types often have diverse installation instructions and functional test requirements, further increasing the cost of production. Additionally, the prior art design process also increases the operating cost of the aircraft because operators are required to maintain spares for each of the numerous actuator types installed in the aircraft. This increases the cost of maintaining an inventory of spare parts because it increases the physical number of spares that must be kept on hand. It also makes for a complex supply chain because the correct actuator type must be identified, located in storage, and transported to the maintenance point without error. A further shortcoming of the prior art design process, and resulting design, is that control law sets are tailored to specific control sizes and locations. Accordingly, it can be difficult to adapt the control law set of one vehicle to other vehicle designs, and/or other operating requirements.

SUMMARY

The present invention is directed generally toward the sizing of vehicle control surfaces and, particularly, to vehicle control surfaces on vehicles that operate in a fluid flow environment. One aspect of the invention is directed toward a method for sizing at least a portion of a vehicle control system, including selecting an actuator mechanism capability and at least one op rating requirement. The method further includes determining the number and size of a plurality of control surfaces that are required to satisfy the at least one operating requirement during operation in an adjacent flow field so that, in response to at least one command signal, each control surface is actively positioned by one or more actuator mechanisms having the actuator mechanism capability.

For example, the method can include selecting an actuator mechanism rate and load (or force) capability, and at least one operating requirement (e.g., a range of airspeeds and altitudes). The method can further include determining the number and size of a plurality of control surfaces that are required to satisfy the at least one operating requirement during operation in an adjacent flow field so that, in response to at least one command signal, each control surface is actively positioned by an actuator mechanism having the selected rate and load capability. Additionally, the method can include installing the control surfaces, and the corresponding actuator mechanisms, side by side along approximately an entire span of a trailing edge of an aircraft wing.

In another aspect of the invention, a method for sizing a portion of a vehicle control system can include selecting a set of control laws and selecting at least one operating requirement. The method can further include determining the number and size of a plurality of control surfaces that are required to satisfy the at least one operating requirement during operation in an adjacent flow field so that, in response to at least one command signal in accordance with the set of control laws, each control surface is actively positioned by an actuator mechanism having the actuator mechanism capability.

In any of the above arrangements, the location for the control surfaces can be determined while determining the number and size of control surfaces to be used. In other arrangements, the possible locations available to place the plurality of control surfaces can be constrained prior to determining the size, number, and actual location of the control surfaces.

DETAILED DESCRIPTION

The present disclosure describes vehicle control systems and methods for sizing control surfaces of such systems. Several specific details of the invention are set forth in the following description, and in FIGS. 2-7 in the context of aircraft configurations, to provide a thorough understanding of certain embodiments of the invention. One skilled in the art, however, will understand that the present invention may have additional embodiments, and that other embodiments of the invention may be practiced without several of the specific features explained in the following description.

Figure 2:
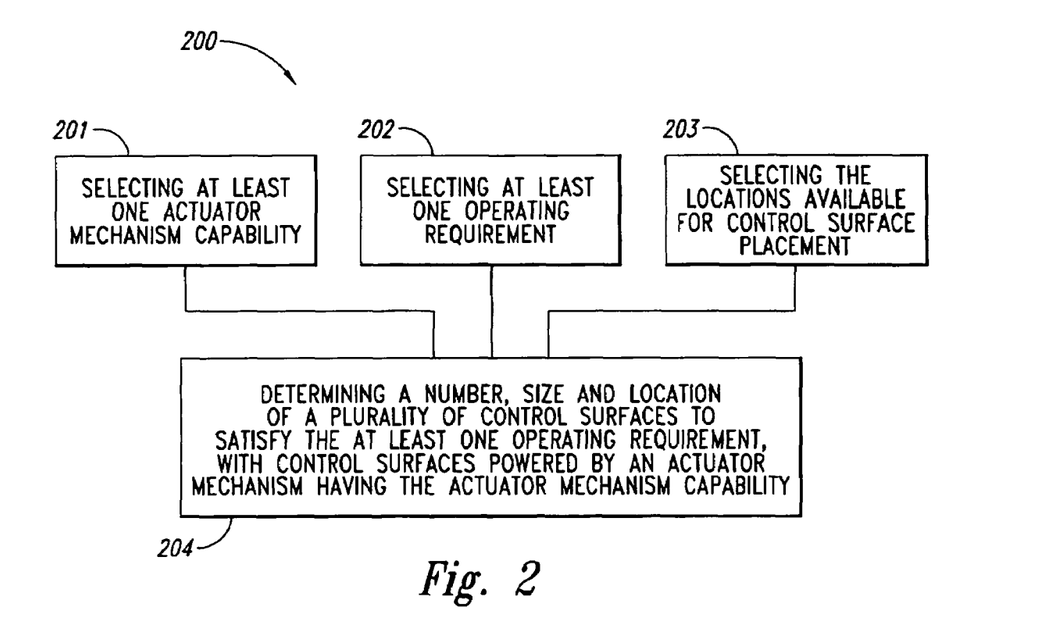
FIG. 2 is a flow chart illustrating a control sizing process in accordance with an embodiment of the invention.

FIG. 2 is a flow chart depicting a control sizing process 200 in accordance with certain embodiments of the invention. In one aspect of this embodiment, the process includes selecting an actuator mechanism capability (process portion 201), and selecting at least one operating requirement (process portion 202). The process 200 further includes determining a number, size, and location of a plurality of control surfaces to satisfy the at least one operating requirement (process portion 204), assuming the control surfaces are powered by an actuator mechanism having the capability selected in process portion 201.

The actuator mechanism capability can include a rate capability, a force generating capability, a damping capability, or other actuation characteristic. The at least one operating requirement can include vehicle characteristics, the environment in which the vehicle will operate, and/or various operating states that the vehicle may experience. For example, the vehicle characteristics can include vehicle size and weight, the speed of the vehicle through the fluid, and the forces and moments that the vehicle must be able to generate to achieve a selected level of maneuverability. Environmental factors can include, among other things, a range of fluid density, a range of fluid temperature, and the motion of the fluid, including any environmental discontinuities such as sudden changes in fluid velocity (e.g., wind shears). Operating states can include, among other things, the configuration of the vehicle, including a carriage of external stores, the capability to operate with at least one power plant failure, and/or the capability to operate with a control surface that is jammed such that it will not move from a fixed position.

In one embodiment (unless otherwise constrained), the control surfaces may be located anywhere on the vehicle where the control surface can interact with an adjacent flow field, as described in further detail below. Additionally, the control surfaces can be located, sized and provided in specific quantities so that at least some of the control surfaces can have multiple purposes. For example, when the vehicle is an aircraft, the same control surface may be used to provide high lift characteristics for takeoff and landing, as well as roll control and/or increased drag characteristics during various phases of flight.

In another embodiment of the invention, the process 200 can include selecting the possible control surface locations available for placing the control surfaces (process portion 203). Then the number, size, and location of the plurality of control surfaces determined in process portion 204 can be determined while limiting control surface placement to the locations selected in process portion 203.

Figure 3:
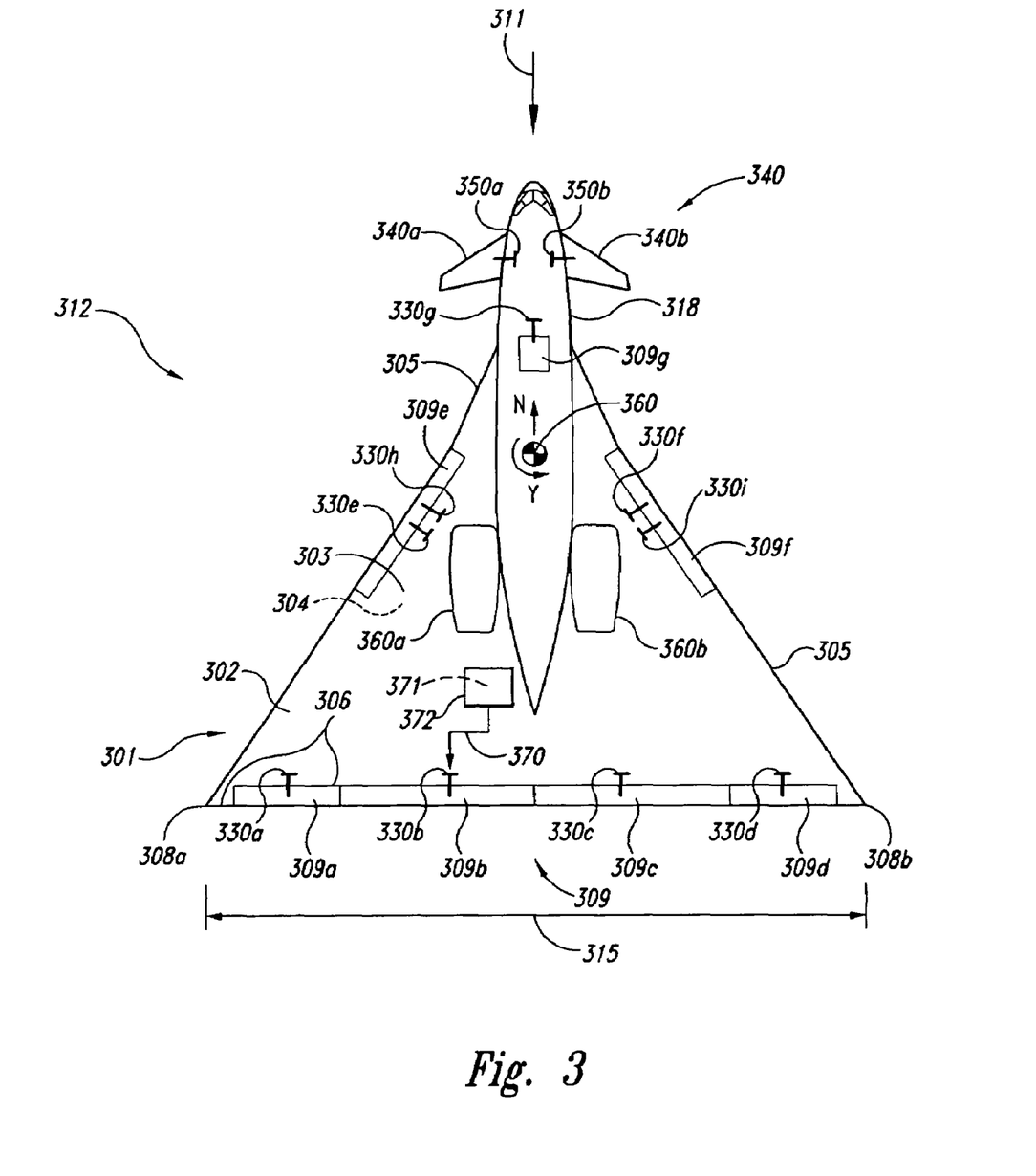
FIG. 3 is a partially schematic view of a vehicle with multiple control surfaces installed in accordance with an embodiment of the invention.

FIG. 3 is a partially schematic view of a vehicle 312 (e.g., an aircraft) with multiple first control surfaces 309 and multiple second control surfaces 340 sized and installed in accordance with an embodiment of the invention. The vehicle 312 can include an external fluid flow body 301 (e.g., an aircraft lifting surface), having a forward portion 302. The forward portion 302 can include a first flow surface 303 and a second flow surface 304 facing opposite the first flow surface 303. The juncture of the first flow surface 303 and the second flow surface 304 can form a leading edge 305, a trailing edge 306, a first trailing edge tip 308a, and a second trailing edge tip 308b. A trailing edge span 315 extends from the first trailing edge tip 308a to the second trailing edge tip 308b.

In certain embodiments of the invention, vehicle 312 includes a portion of a control system having a plurality of the first control surfaces 309 distributed on various external surfaces of the vehicle 312. Seven first control surfaces 309a-309g are shown in FIG. 3. Four first control surfaces 309a-309d are coupled to the trailing edge 306 of the external fluid flow body 301, and are distributed across approximately the entire trailing edge span 315. Two first control surfaces 309e-309f are coupled to the leading edge 305 of the external fluid flow body 301. One first control surface 309g is coupled to a body portion 318 of the vehicle 312. Other embodiments can include more or fewer control surfaces and/or control surfaces having other locations. For example, in one embodiment, the vehicle 312 can have three first control surfaces 309 distributed across approximately the entire trailing edge span 315.

The first control surfaces 309 are movable and configured to interact with an adjacent flow field 311 created by the relative motion between the vehicle 312 and the surrounding fluid. Through this interaction, the first control surfaces 309 create forces and moments (representative examples of which are indicated by arrows N and Y, respectively), which can be resolved about the center of gravity 360 of the vehicle 312. These forces and moments in turn affect the motion of the vehicle 312 and/or the path of the vehicle 312 through the fluid.

Each of the first control surfaces 309 can be positioned by a corresponding first actuator mechanism 330 (nine are shown in FIG. 3, as first actuator mechanisms 330a-330i). Other embodiments can have more or fewer first actuator mechanisms 330. The first actuator mechanisms 330 actively position the first control surfaces 309 in response to at least one command signal 370 (although all first actuator mechanisms 330 may receive command signals, only one command signal directed to first actuator mechanism 330b is shown in FIG. 3 for the sake of illustration). The command signal 370 can be a pure mechanical transmission of a control input provided by an operator or another vehicle system, or it can be an input signal provided by a fly-by-wire or fly-by-light system. Additionally, the command signal 370 can be generated by a set of control laws 371, stored in an onboard computer 372, which is used to augment or control the vehicle 312, as discussed in further detail below.

As shown in FIG. 3, the first control surfaces 309 not only can be located on different portions of the vehicle 312, but also can vary in physical characteristics (e.g., the shape, span, and chord). By choosing the appropriate physical characteristics for each first control surface 309 (e.g., sizing the first control surfaces 309), the at least one operating condition can be met with each first control surface 309 being positioned by a single first actuator mechanism 330, with each actuator mechanism 330 having approximately the same actuation characteristics. In other embodiments, at least one of the first control surfaces (e.g., first control surfaces 309f-309g) can be sized to require two or more first actuator mechanisms 330 in order to meet the at least one operating requirement. In any of these embodiments, all the first control surfaces 309 are powered by first actuator mechanisms 330 having at least approximately the same actuation characteristics.

In another aspect of the foregoing arrangement, at least one of the first control surfaces 309 can perform multiple functions. For example, if the vehicle 312 includes an aircraft, the body portion 318 includes a fuselage, and the external fluid flow body 301 includes a wing, the first control surfaces 309a-309d coupled to the trailing edge 306 can be actively positioned to control both pitch and roll. Additionally, these first control surfaces 309a-309d can function as drag rudders providing direction control throughout the flight envelope.

In a particular embodiment, the first control surfaces 309 can function as drag rudders and can be used to counter the moments resulting from a power plant failure. For instance, vehicle 312 can include at least one power plant 360 (two are shown in FIG. 3 as a left power plant 360a and a right power plant 360b). If the left power plant 360a fails, the right power plant 360b will cause a yawing moment in the direction of arrow Y in FIG. 3. This moment can be countered, or balanced, by deflecting the right two first control surfaces 309c-309d on the trailing edge 306 of the wing in opposite directions by different magnitudes. The drag produced by these deflections can offset the yawing moment caused by the failure of the left power plant 360a, and the appropriate level of drag can be maintained while the right two first control surfaces 309c-309d continue to function with the other first control surfaces 309a-309b on the trailing edge 306 of the wing to control pitch and roll. In other embodiments, the first control surfaces 309 are installed on a lifting body or a flying wing and perform similar functions.

The vehicle 312 can also include at least one second control surface 340 (two are shown in FIG. 3 as a left second control surface 340a and a right second control surface 340b). The at least one second control surface 340 is configured to be movable in a manner such that it can interact with the flow field 311 to create forces and moments on the vehicle 312. Each second control surface 340 can be coupled to at least one second actuator mechanism 350 (two are shown in FIG. 3 as a left second actuator mechanism 350a and a right second actuator mechanism 350b). In some embodiments, the second actuator mechanism 350 can have actuation capabilities approximately identical to those of the first actuator mechanisms 330, even if the number, size, and location of the second control surfaces 340 were not determined using the same process as that used to determine number, size, and location of the first control surfaces 309. In other embodiments, multiple second actuator mechanisms 350 can be coupled to a single second control surface 340. In still other embodiments, the second actuator mechanisms 350 can have actuation capabilities different than those of the first actuator mechanisms 330.

Figure 4:
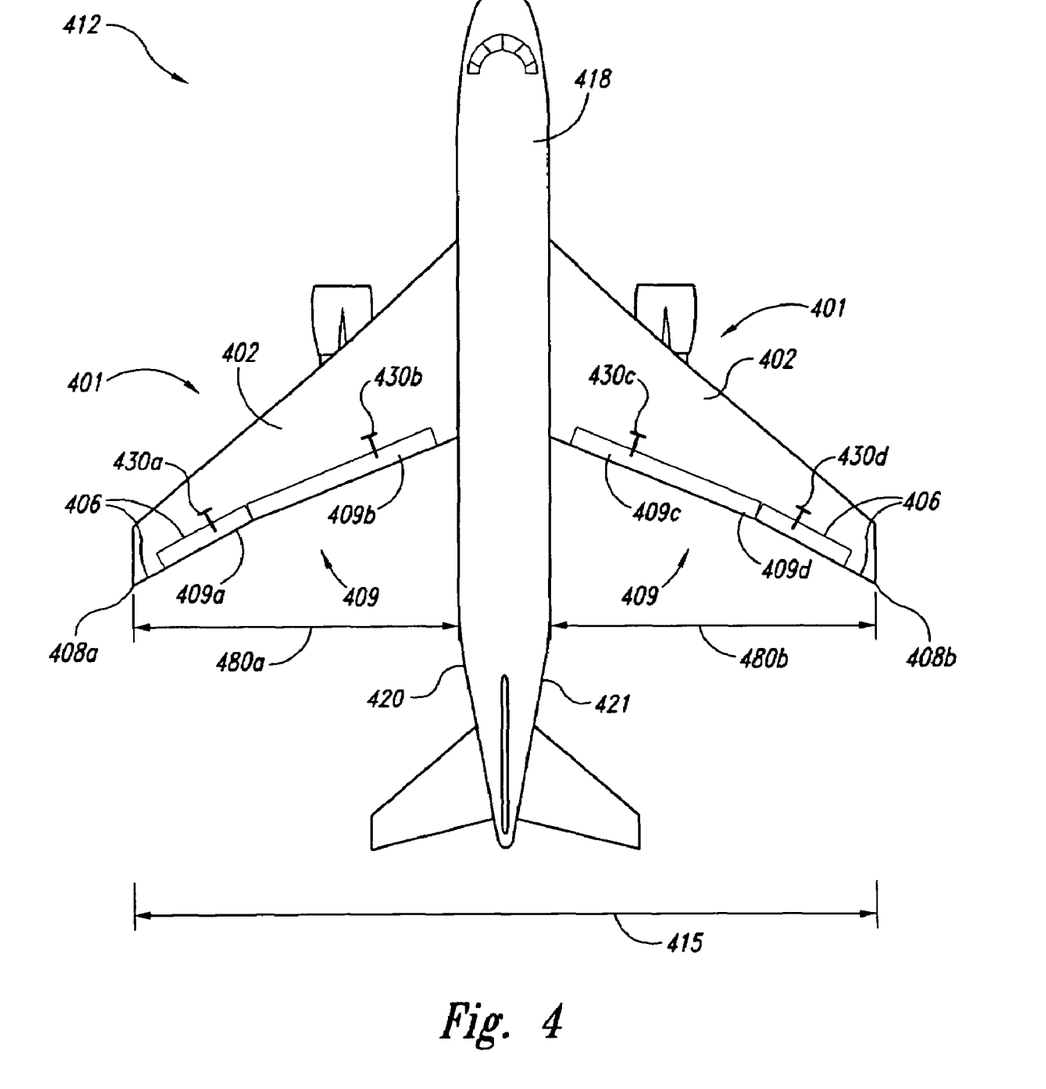
FIG. 4 is a partially schematic view of a vehicle with multiple control surfaces installed in accordance with another embodiment of the invention.

FIG. 4 is a partially schematic view of a vehicle 412 with multiple first control surfaces 409 sized and installed in accordance with another embodiment of the invention. In this embodiment, the vehicle 412 can include an external fluid flow body 401 (e.g., a wing) with a forward portion 402. The forward portion 402 can have a trailing edge 406 and a trailing edge span 415 extending from a first trailing edge tip 408a to a second trailing edge tip 408b. The trailing edge span 415 can be interrupted by a body portion 418 of the vehicle 412, making the trailing edge span 415 of the external fluid flow body 401 noncontinuous. Accordingly, the trailing edge span 415 can have a first span portion 480a extending from the first trailing edge tip 408a to a first portion 420 of the vehicle 412 and a second span portion 480b extending from a second portion 421 of the vehicle 412 to the second trailing edge tip 408b.

A plurality of first control surfaces 409 can be distributed across approximately the entire first span portion 480a and the entire second span portion 480b of the trailing edge 406. For example, four first control surfaces 409a-409d are shown in FIG. 4. A first actuator mechanism 430 (shown as first actuator mechanisms 430a-430d) can be coupled to each first control surface 409, with the first actuator mechanisms 430 all having approximately the same actuation capability.

The first control surfaces 409 can be configured to perform multiple functions in a manner generally similar to that discussed above with reference to FIG. 3. For example, in FIG. 4 the vehicle 412 can include an aircraft. The external fluid flow body 401 can include a wing, the body portion 418 can include a fuselage, and the first and second portions 420, 421 can include a first and second side of the fuselage. The first control surfaces 409 coupled to the trailing edge 406 of the forward portion 402 of the wing can be used to increase lift, to increase drag, and to affect control of the aircraft in yaw, pitch, and roll. Additionally, these first control surfaces 409 can operate to produce a minimum drag configuration in cruise, to control the spanwise lift distribution, and to affect the strength of wing tip vortices. Other embodiments of the invention can have more or fewer first control surfaces 409 distributed across approximately the entire first and second span portions 480a, 480b of the trailing edge 406. For example, six to ten first control surfaces 409 can be used to provide a larger number of first control surfaces 409 that can be independently positioned to affect performance and control of the aircraft.

Figures 5, 6:
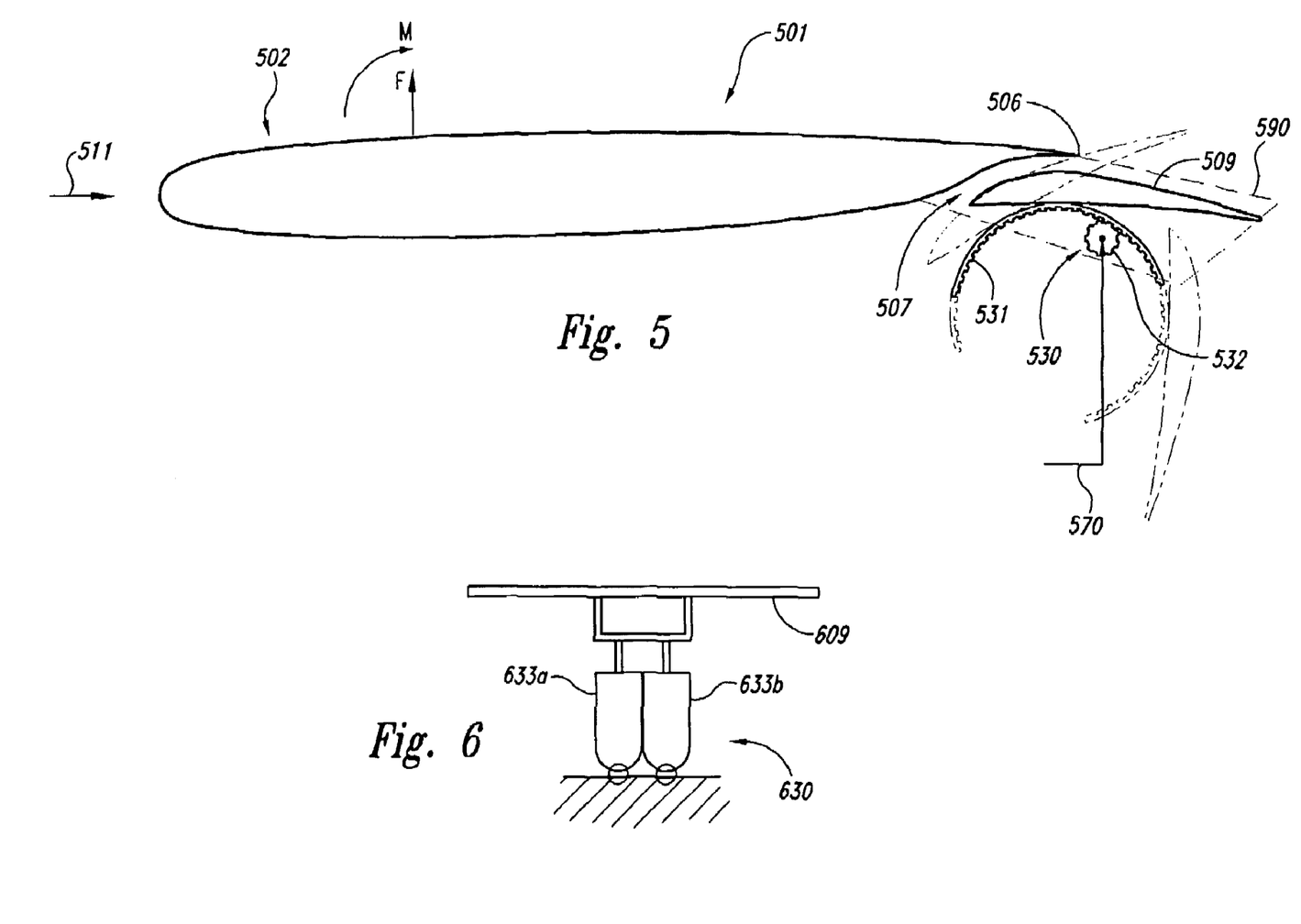
FIG. 5 is a partially schematic cross sectional view of an external fluid flow body with a control surface and actuator mechanism in accordance with an embodiment of the invention.
FIG. 6 is a partially schematic view of an actuator mechanism in accordance with an embodiment of the invention.

FIG. 5 depicts a cross sectional view of an external fluid flow body 501 having a first control surface 509 in accordance with another embodiment of the invention. The external fluid flow body 501 can include any vehicle surface exposed to the flow field 511, for example, an airfoil section, a supercritical airfoil section, or a combination of these elements. The external fluid flow body 501 shown in FIG. 5 includes a supercritical airfoil section having a forward portion 502 with a trailing edge 506. The first control surface 509 can be coupled to the trailing edge 506 to interact with an adjacent flow field 511. As the first control surface 509 moves, it affects forces and moments (represented by arrows F and M) on the external fluid flow body 501.

The first control surface 509 can be coupled to the forward portion 502 via a first actuator mechanism 530. The first actuator mechanism 530 can be supported by, and/or enclosed in, an aerodynamic shroud 590 (shown schematically in FIG. 5), or support d by other methods commonly known by those skilled in the art. The first actuator mechanism 530 can include a jackscrew, a ported hydraulic actuator, a rack and pinion actuator, or another suitable actuator device or devices. The first actuator mechanism 530 shown in FIG. 5 includes an actuator pinion gear 532 and actuator rack 531.

The first control surface 509 can be configured such that when it is actively positioned by the first actuator mechanism 530 in response to at least one command signal 570, it controls the physical characteristic of a slot 507, defined by the forward portion 502 and the first control surface 509. Multiple control surface positions are shown in FIG. 5 in phantom lines, illustrating how at least one characteristic (e.g., the width) of the slot 507 changes as the first control surface 509 moves. Large deflections of the first control surface 509 can be used to create a high drag configuration by placing the first control surface 509 nearly perpendicular to the chord of the forward portion 502.

FIG. 6 illustrates a first actuator mechanism 630 having multiple actuators 633 (two are shown in FIG. 6 as a first actuator 633a and a second actuator 633b), in accordance with another embodiment of the invention. The actuators 633 are configured to operate together to actively position a first control surface 609. In one embodiment, the actuators 633a, 633b can have approximately identical actuation capabilities and can be of the same type (e.g., both hydraulic). In another embodiment, each actuator 633a, 633b can be of a different type. In yet another embodiment, each actuator 633a, 633b can have different capabilities. For example, the first actuator 633a can have a high actuation rate capability and the second actuator 633b can have a high actuation force capability, allowing the first actuator mechanism 630 to satisfy high rate and high force requirements. In any of these embodiments, similar first actuator mechanisms 630 can power other first control surfaces, as described above with reference to FIG. 3.

One feature of the foregoing embodiments is that a single type of first actuator mechanism can be used to power first control surfaces having different configurations and physical characteristics. This is unlike the portion of the aircraft control system depicted in FIG. 1, which requires actuators with numerous different characteristics to drive the various control surfaces on the wing 1. An advantage of the present arrangement is that fewer different types of actuator mechanisms are required to be designed, manufactured, and inventoried for use in production. Reducing the number of different types of actuator mechanisms can also reduce the required number of diverse installation instructions and functional test specifications, further reducing production costs. Additionally, the operating cost of the aircraft can be reduced because operators are required to maintain fewer spares. Furthermore, the corresponding supply chain can be simplified because there are fewer different types of actuator mechanisms that must be identified, located, and transported to the point of service when maintenance is required.

Using the first control surfaces to perform multiple functions (as described above with reference to FIGS. 2-6) can require complex implementation arrangements. Accordingly, designers can use a set of control laws to augment or fully control the first control surfaces. Suitable methods and computer programs for controlling the actuators of an aerodynamic vehicle are described in U.S. Pat. No. 6,591,169, which is incorporated herein in its entirety by reference. Such methods are particularly well suited to take advantage of the synergism that can be achieved by using multiple first control surfaces. Additionally, such methods can be used to determine the real time effectiveness of a control surface and to recruit other control surfaces to achieve a desired response. Accordingly, in one embodiment of the present invention, such methods can be used to augment the process of determining the number, size, and location of the first control surfaces by identifying how the various first control surfaces, singularly or in combination, can be used to satisfy an operating requirement. The operating requirement can include, but is not limited to, loss of a power plant or a jammed control surface. In other embodiments of the invention, other sets of control laws (e.g., a C-star control law, which is generally available) can be used, or a pure mechanical system can be implemented. In still other embodiments, as discussed below, a set of control laws can be selected before the control surfaces are sized.

Figure 7:
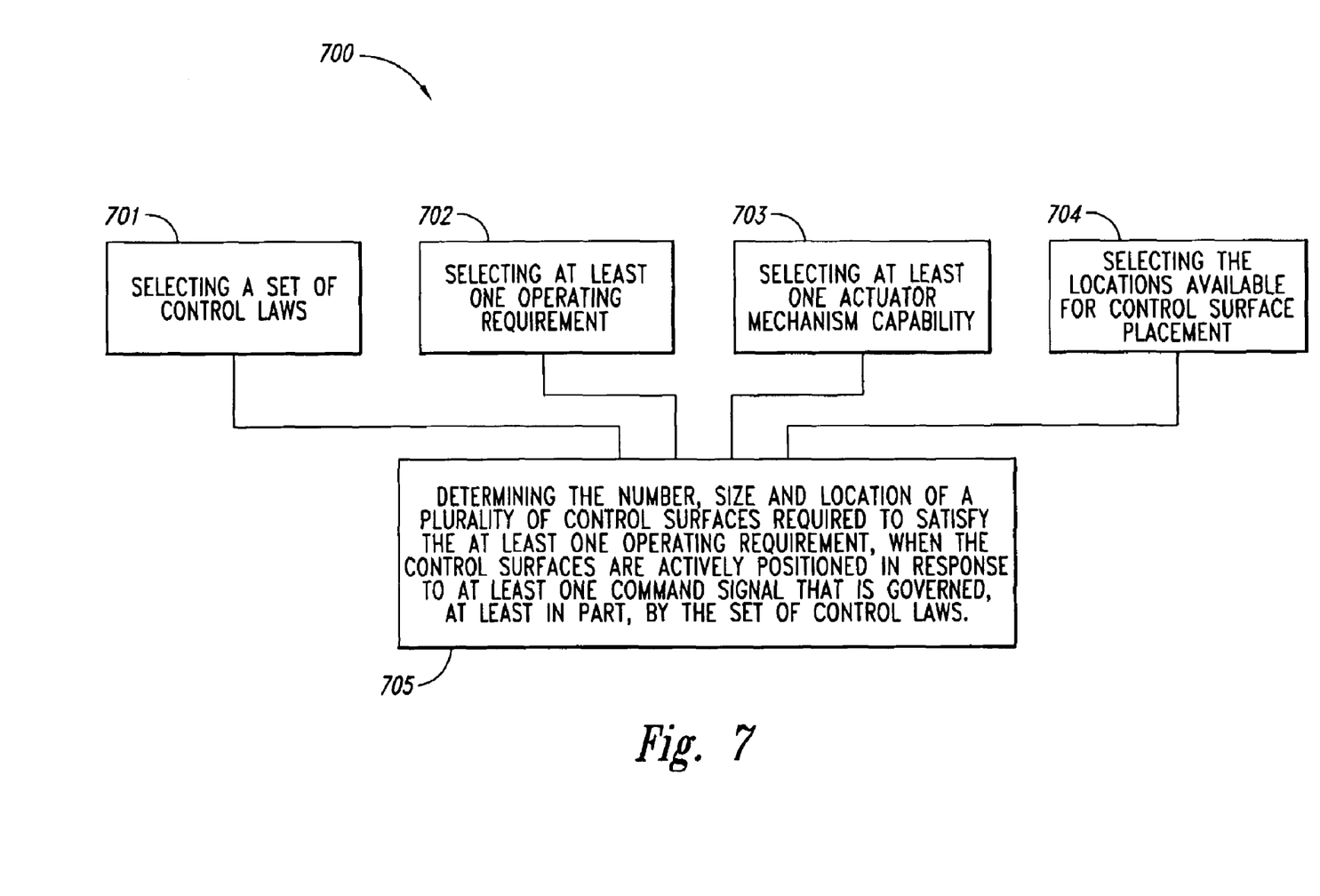
FIG. 7 is a flow chart illustrating a vehicle control sizing process in accordance with another embodiment of the invention.

FIG. 7 is a flow chart illustrating a control sizing process 700 in accordance with an embodiment of the invention. The process 700 can include selecting a set of control laws (process portion 701) and at least one operating requirement (process portion 702). The process further includes determining the number, size, and location of a plurality of control surfaces required to satisfy the at least one operating requirement, when the control surfaces are actively positioned in response to at least one command signal that is governed, at least in part, by the set of control laws (process portion 705). As discussed above, the control surfaces can be located on any portion of the vehicle where the control surface can interact with the flow field to generate forces and moments.

In another embodiment, prior to determining the number, size, and location of a plurality of control surfaces (process portion 705), the possible locations for the control surfaces can be constrained by selecting only certain locations of the vehicle (process portion 704). In another embodiment, at least one actuator mechanism capability can be selected (process portion 703) prior to determining the number, size, and location of a plurality of control surfaces (process portion 705), such that each control surface is actively positioned by an actuator mechanism having the selected actuator mechanism capability (process portion 703). In still other embodiments, the method can include both selecting an actuator mechanism capability (process portion 703) and constraining the possible locations for control surface placement (process portion 704) prior to determining the number, size, and location of the plurality of control surfaces (process portion 705). In still further embodiments, the set of control laws can include methods and computer programs for controlling the actuators of an aerodynamic vehicle, such as those described in U.S. Pat. No. 6,591,169.

One feature of the process described above with reference to FIG. 7 is that an existing set of control laws can be easily adapted for use in a vehicle with characteristics different from the characteristics of a vehicle for which the set of control laws was initially developed. By determining the number, size, and location of the control surfaces based, at least in part, on the selected set of control laws, operating requirements can be met with little or no change to the selected set of control laws. An advantage of this arrangement is that a common set of control laws can be used on a number of vehicles with different characteristics, while avoiding, at least in part, some of the very expensive development costs of designing a new set of control laws or drastically redesigning an existing set.

From the foregoing, it will be appreciated that specific embodiments of the invention have been described herein for purposes of illustration, but that various modifications may be made without deviating from the spirit and scope of the invention. Apparatuses and methods in accordance with further embodiments of the invention can include other combinations of the features described above. For example, in other embodiments the first control surfaces can be distributed across the trailing edge of other types of external fluid flow bodies and the span can be interrupted by another portion of the vehicle or a second external fluid flow body. In one embodiment, a horizontal tail of an aircraft can have a plurality of first control surfaces distributed across its trailing edge, and the span of the trailing edge can be interrupted by the vertical tail of the aircraft. Furthermore, some or all aspects of the foregoing embodiments are not limited to use on aircraft and have similar advantages when incorporated into other types of vehicles intended to operate in various types of fluid flow environments. Accordingly, the invention is not limited except by the following claims.

I claim:

1. A portion of a vehicle control system, comprising:
   at least one external fluid flow body having a forward portion with a first flow surface, a second flow surface facing opposite the first flow surface, and a trailing edge at a juncture of the first flow surface and the second flow surface, the trailing edge having a span extending from a first trailing edge tip to a second trailing edge tip;
   a plurality of control surfaces, each having at least a portion aft of the trailing edge of the external fluid flow body, the control surfaces being movable relative to the at least one external fluid flow body to control forces and moments on the external fluid flow body by interacting with an adjacent flow field; and
   a plurality of electro hydraulic actuator mechanisms, each having an approximately identical control capability, wherein the control capability includes approximately identical maximum actuation rate and approximately identical maximum actuation force, at least one actuator mechanism being coupled to each of the control surfaces to actively position the control surfaces in response to command signals, wherein the plurality of actuator mechanisms are the only actuator mechanisms coupled to the control surfaces to actively move the control surfaces in response to the command signals.

2. The system of claim 1 wherein the control surfaces are distributed across at least approximately the entire span of the trailing edge.

3. The system of claim 1 wherein the control surfaces are installed on an aircraft and wherein at least one of the control surfaces can be positioned to cause the aircraft to roll, increase a drag of the aircraft, or both.

4. The system of claim 1 wherein the control capability includes a maximum actuation rate.

5. The system of claim 1 wherein the control capability includes a maximum actuation force.

6. The system of claim 1 wherein the control capability includes a maximum actuation rate and a maximum actuation force.

7. The system of claim 1 wherein the actuator mechanisms each include a single actuator.

8. The system of claim 1 wherein the actuator mechanisms each include at least two actuators.

9. The system of claim 1 wherein the actuator mechanisms each include a hydraulic actuator.

10. The system of claim 1 wherein at least one of the control surfaces is coupled to two actuator mechanisms.

11. The system of claim 1 wherein the external fluid flow body includes an airfoil coupled to an aircraft and wherein the span is noncontinuous, with a first span portion extending from the first trailing edge tip to a first portion of the aircraft and a second span portion extending from a second portion of the aircraft to the second trailing edge tip, and wherein the plurality of control surfaces are distributed across at least approximately the entire first span portion and the entire second span portion.

12. The system of claim 1 wherein the at least one external fluid flow body includes an airfoil, the airfoil extending through an aircraft fuselage, the span being noncontinuous, with a first span portion extending from the first trailing edge tip to a first side of the aircraft fuselage and a second span portion extending from a second side of the aircraft fuselage to the second trailing edge tip, and wherein the control surfaces are distributed across at least approximately the entire first span portion and the entire second span portion.

13. The system of claim 1 wherein the at least one external fluid flow body includes a forward portion of a wing coupled to an aircraft, the forward portion of the wing having a trailing edge, the span extending from a first trailing edge tip of the forward portion of the wing to a second trailing edge tip of the forward portion of the wing, and wherein the plurality of control surfaces are distributed across at least approximately the entire span.

14. The system of claim 1 wherein the control surfaces include control surfaces on both sides of a vehicle longitudinal axis, and wherein the plurality of actuator mechanisms includes multiple actuator mechanisms having an approximately identical control capability and located on the same side of the vehicle longitudinal axis.

15. An aircraft, comprising:

a fuselage;

a forward wing portion, the forward wing portion having a leading edge and a trailing edge, the trailing edge of the forward wing portion having a span extending from a first trailing edge tip to a second trailing edge tip;

a plurality of control surfaces, each having at least a portion positioned aft of the trailing edge, the control surfaces being distributed across at least approximately the entire span of the trailing edge, the control surfaces being movable relative to the forward wing portion to control forces and moments on the forward wing portion by interacting with an adjacent flow field; and a plurality of electro hydraulic actuator mechanisms, each having an approximately identical control capability, wherein the control capability includes approximately identical maximum actuation rate and approximately identical maximum actuation force, each actuator mechanism being coupled to a control surface to actively position the corresponding control surface in response to command signals, wherein the plurality of actuator mechanisms are the only actuator mechanisms coupled to the control surfaces to actively move the control surfaces in response to the command signals.

16. The system of claim 15 wherein the span is noncontinuous and includes a first span portion extending from the first trailing edge tip to a first side of the fuselage and a second span portion extending from a second side of the fuselage to a second trailing edge tip, and wherein the multiple control surfaces are distributed across at least approximately the entire first span portion and the entire second span portion.

17. The system of claim 15 wherein the forward wing portion includes a forward portion of a supercritical airfoil, and wherein at least one of the control surfaces is coupled to the forward portion of the supercritical airfoil, the at least one control surface being configured to change a physical characteristic of a slot, defined by the forward portion of the supercritical airfoil and the at least one control surface, as the at least one control surface is actively positioned.

18. The system of claim 15 wherein the control surfaces include control surfaces on both sides of a longitudinal axis of the fuselage, and wherein the plurality of actuator mechanisms includes multiple actuator mechanisms having an approximately identical control capability and located on the same side of the longitudinal axis of the fuselage.

* * * * *

UNITED STATES PATENT AND TRADEMARK OFFICE
CERTIFICATE OF CORRECTION

PATENT NO. : 7,424,350 B2  Page 1 of 1
APPLICATION NO. : 10/770256
DATED : September 9, 2008
INVENTOR(S) : Thomas E. Speer It is certified that error appears in the above-identified patent and that said Letters Patent is hereby corrected as shown below:

On the title page, item (56), under "Other Publications", in column 2, line 2, delete "shpe" and insert -- shape --, therefor.

On page 2, under "U.S. Patent Documents", in column 1, line 28, below "3,203,647 A 8/1965 Alvarez-Calderon" insert -- 3,263,946 08/1966 Roberts et al. --.

On page 2, under "U.S. Patent Documents", in column 2, line 73, below "4,747,375 A 5/1988 Williams" insert -- 4,779,822 10/1988 Burandt et al. --.

On page 3, under "U.S. Patent Documents", in column 1, line 5, below "4,823,836 A 4/1989 Bachmann et al." insert -- 4,834,319 05/1989 Ewy et al. --.

On page 4, under "U.S. Patent Documents", in column 2, line 21, delete "Aeornautics" and insert -- Aeronautics --, therefor.

On page 4, under "U.S. Patent Documents", in column 2, line 60, below "org/w/index.php?title=Slats&oldid=60827639>." insert -- REA, J., "Boeing 777 High Lift Control System," Boeing Commercial Airplane Group, IEEE AES Systems Magazine, August 1993, pages 15-21 --.

In column 2, line 6, delete "b" and insert -- be --, therefor.

Signed and Sealed this

Twenty-second Day of June, 2010

David J. Kappos
*Director of the United States Patent and Trademark Office*